United States Patent Office 3,557,263
Patented Jan. 19, 1971

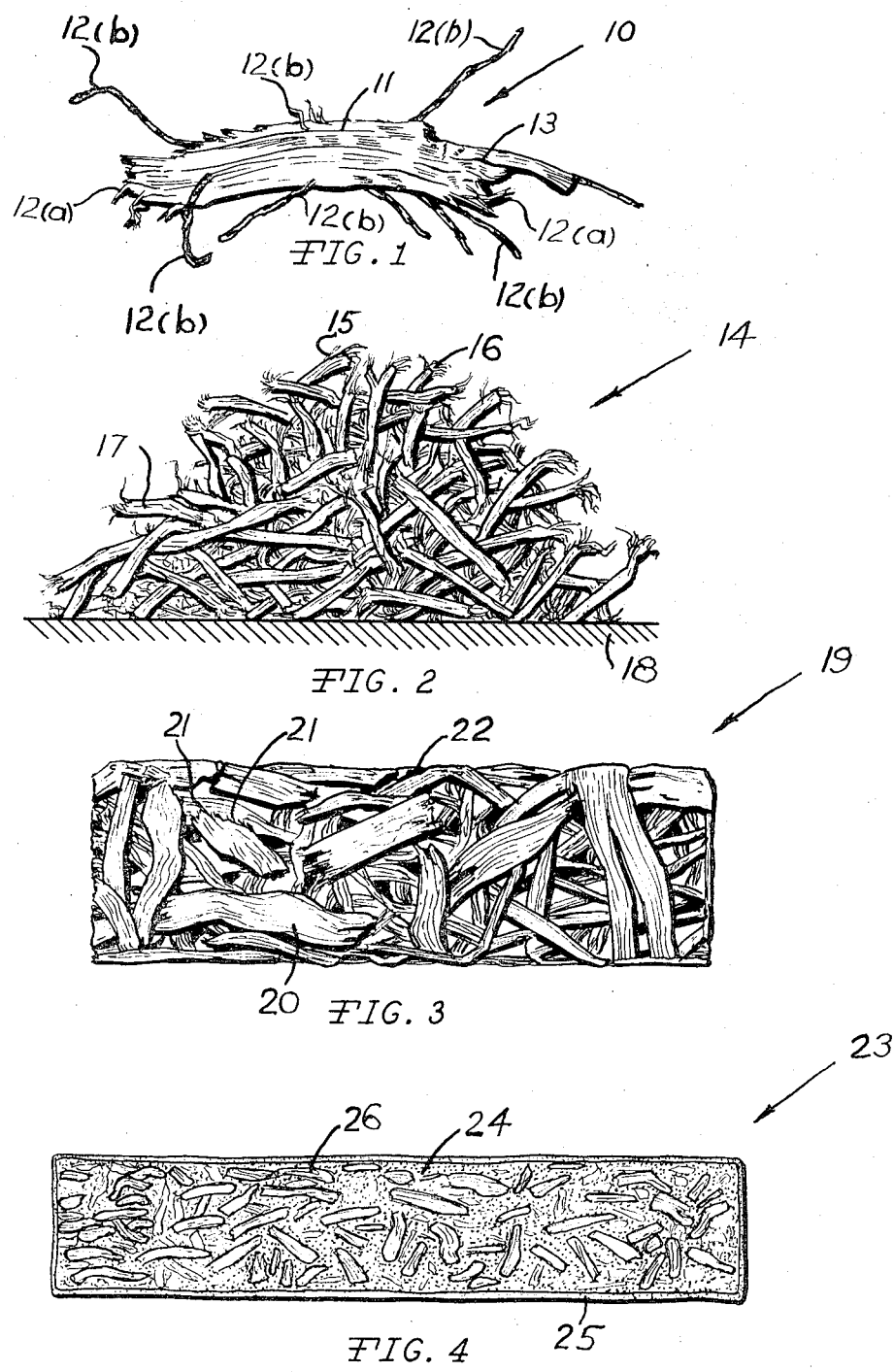

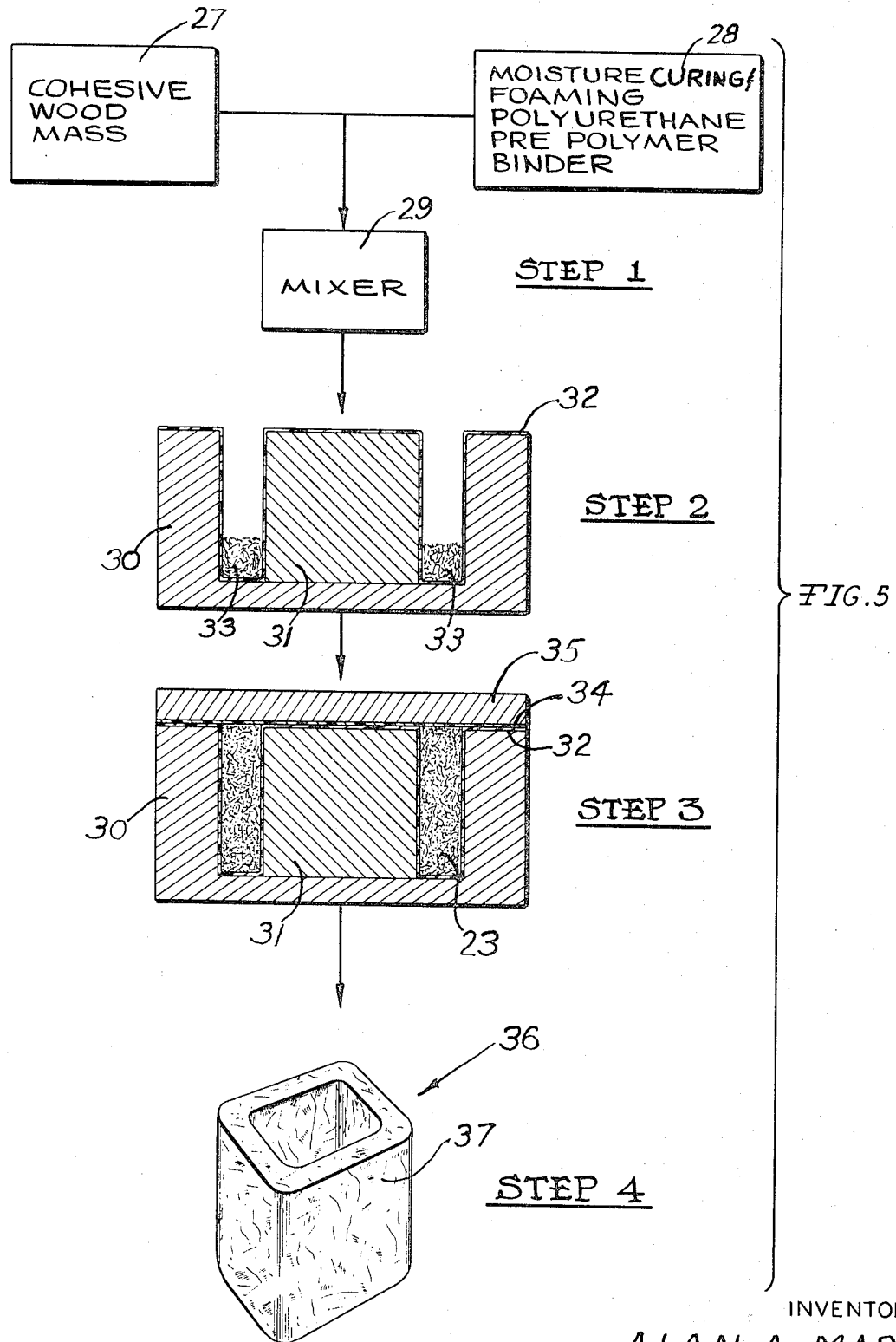

3,557,263
PROCESS FOR THE PREPARATION OF RIGID
COMPOSITE WOOD PRODUCTS
Alan A. Marra, 915 Sunset, Ann Arbor, Mich. 48103
Filed Aug. 15, 1967, Ser. No. 660,806
Int. Cl. B27l 11/08; B29j 5/00; B32b 21/02
U.S. Cl. 264—45         9 Claims

ABSTRACT OF THE DISCLOSURE

A process for the preparation of rigid composite products with similar physical characteristics in all dimensions or directions from a three dimensional skeletal structure formed of randomly oriented elongate sticks with multiple fibrous projections which maintain the elongate sticks in a loosely cohesive mass which is shaped or molded and made rigid with a binder is described. Various liquid binders both organic and inorganic are used which do not require compression of the cohesive mass and liquid binder in order to be hardened and develop bond strength for consolidating the product into formed or molded shapes.

BACKGROUND OF INVENTION

The present invention relates to novel rigid composite products and to the process for the preparation thereof. In particular the present invention relates to rigid composite products having an unique structure of elongate sticks in the form of a three dimensional skeletal structure which are bonded together by a binder without compressing the three dimensional skeletal structure so that the resulting composite product has similar physical characteristics in all dimensions and does not contain internal stresses.

Materials which have similar physical characteristics in all dimensions are generally referred to as being "isotropic." The rigid composite products of the present invention have similar physical characteristics in all dimensions and thus are isotropic by comparison to known prior art composite materials, which have very different physical properties in different dimensions. The prior art materials are very anisotropic for the reasons set forth below.

A problem encountered by the prior art is with the inherent anisotropic physical characteristics of certain materials, particularly cellulosic materials such as wood which is caused by the growing characteristics of the trees and produces the familiar grain properties of wood. Thus the strength characteristics of wood parallel with the grain are good and normal to the grain are poor. One important prior art method of improving the strength characteristics of wood is to cross the grain of bonded contiguous wood members when strength is to be equalized in all directions of a single plane. Cross bonded grain of this kind is found in plywood, wood flake board, wood particle board, fiberboard, paper and the like. The prior art composite products made from inherently anisotropic structural elements, while desirable for situations where load stresses are in directions parallel to the cross bonded grain, cannot easily carry stresses in the directional normal to the cross bonded grain as is often necessary in conventionally fabricated cornered structures. Moreover such cross grained materials do not form or mold readily into configurations other than planar or simple curves.

When fibers are deposited onto a surface and then are compressed against the surface in forming a composite product, the fibers tend to orient or stratify themselves in a single plane parallel to the surface and normal to the direction of compression and the resulting composite product has very anisotropic physical characteristics, particularly strength characteristics, since the dimension normal to compression has few fibers in this orientation and is therefore much weaker than the dimensions parallel to the sruface. This is distinct disadvantage where the composite product must sustain multidirectional loads.

The prior art has also used chip or flake shaped elements made of various materials, particularly of wood, with a binder to form rigid composite products. These rigid composite products have very anisotropic physical characteristics because the geometry of the chips or flakes induces layers in a single plane during the deposition step onto a surface. Further, in the formation of composite products from chips or flakes, the binder and chips or flakes are compressed which further increases the anisotropy because of the unidirectional displacement of the individual elements. Such composite products have found wide useage in building applications, but always with the recognition that the physical characteristics such as strength, are much poorer in the direction normal to the plane of the chips or flakes.

Numerous processes are disclosed by the prior art wherein relatively high compression pressures are used in forming composite products from fibers, chips and/or flakes made of various materials as structural elements with a binder. In each instance the compression pressures deform the structural elements and then the binder hardens them in the deformed state. Such composite products have high internal stresses in the direction of compression and exhibit additional anisotropic physical characteristics as a result.

Where compression is used to form the composite products, a source of latent instability is generated within the product because the individual structural elements have been bent, crushed or otherwise deformer in varying amounts producing internal stresses. This latent insatbility severely limits the useful longevity under some use conditions such as high moisture conditions which causes the structural elements to unstress and recover, thereby lowering the strength and changing the dimensions of the composite product.

The prior art has compressed the composite products described above in their formation, usually with heating, in order to harden or cure the binder and in order to reduce the amount of void volume and maximize bonding contact of the structural elements with each other. The anisotropic physical characteristics of the resulting composite products, the difficulty of forming shapes, and the incorporation of a destructive mechanism within the product, are thus necessitated by the process conditions dictated by the structural elements and binder. In the case of wood, these represent restrictions which have severely limited the efficient conversion of vast quantities of low grade timber, the utilization of which affects the economics of managing many natural resources such as watersheds and recreation areas, as well as industrial operations.

The prior art has used various strand or fiber materials to produce composite products without compression; however, in each instance the fibers orient themselves predominantly in a single plane and the composite products have very anisotropic physical characteristics as a result. Thus wood excelsior (generally strands 12 to 18 inches in length) has been used directly or reduced in length to make composite products but the strands having relatively smooth surfaces and uniform cross section form a mat where the strands tend to orient themselves in a single plane nad thus are very anisotropic for this reason.

It is therefore an object of the present invention to provide novel rigid composite products which have isotropic physical characteristics, even though the structural elements forming the rigid composite products are inherently anisotropic. It is further an object of the present invention to provide a process for the preparation of such rigid composite products, without compression, in various forms In the drawings:

FIG. 1 is a front view illustrating the general shape of an elongate wood stick which is preferred in forming the composite products of the present invention.

FIG. 2 is a front view illustrating a loosely cohesive mass of elongate wood sticks such as shown in FIG. 1 in the form of a three dimensional skeletal structure.

FIG. 3 is a front cross-sectional view illustrating a rigid composite product of the present invention prepared from the loosely cohesive mass of elongate wood sticks shown in FIG. 2 which are bonded together with a binder to form a three dimensional skeletal structure with a large void volume between the elongate wood sticks and which exhibits isotropic physical characteristics.

Figure 6:
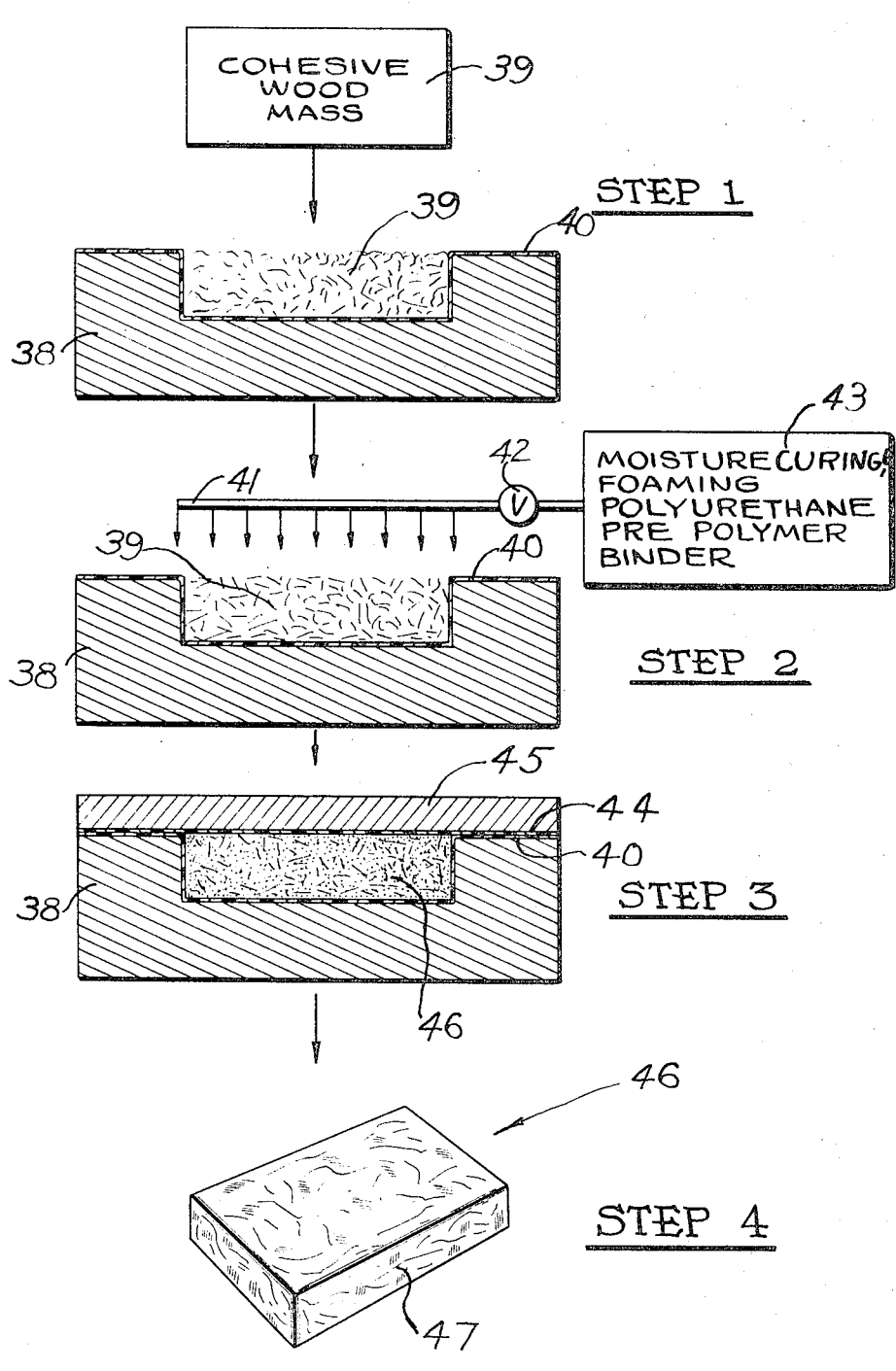

FIG. 4 is a front cross-sectional view illustrating a preferred rigid composite product of the present invention prepared from the loosely cohesive mass of elongate wood sticks shown in FIG. 2 which are bonded together by a foamed resin binder to form a three dimensional skeletal structure of the elongate wood sticks bonded together by the resin which also foams and fills the void volume between the elongate wood sticks and which exhibits isotropic physical characteristics.

FIG. 5 is a schematic view of Steps 1 to 4 of a preferred process of the present invention illustrating the mixing of the loosely cohesive wood mass with a binder which is provided in a forming mold and then hardened without compressing the elongate sticks forming the three dimensional skeletal structure formed by the loosely cohesive mass in order to produce a composite product with isotropic physical characteristics.

FIG. 6 is a schematic view of the Steps 1 to 4 of a preferred process of the present invention illustrating a forming mold for shaping the loosely cohesive mass of elongate sticks so that the binder can be provided within the loosely cohesive mass by spraying and then hardened without compressing the elongate sticks forming the three dimensional skeletal structure formed by the loosely cohesive mass in order to produce a composite product with isotropic physical characteristics.

GENERAL DESCRIPTION

The present invention relates to the rigid composite product which comprises; a three dimensional skeletal structure formed of randomly oriented elongate sticks with multiple fibrous projections which maintain the elongate sticks in a loosely cohesive mass, and a solid binder dispersed throughout the loosely cohesive mass which rigidly bonds the elongate sticks together in the form of the rigid three dimensional skeletal structure. Further, the present invention relates to a process for the preparation of a rigid composite product which comprises: providing a three dimensional skeletal structure formed of randomly oriented elongate sticks with multiple fibrous projections which maintain the elongate sticks in the form of a loosely cohesive mass mixed with a liquid binder which hardens to a solid binder without compressing the elongate sticks and binder together, and maintaining the mixture of the loosely cohesive mass and liquid binder without compressing the elongate sticks and binder together so that the elongate sticks of the cohesive mass are rigidly bonded together and the three dimensional skeletal structure is retained until the binder is hardened to form the rigid composite product. A particularly useful and preferred rigid composite product is prepared using fibrilated elongate wood sticks.

An important feature of the present invention is the use of a three dimensional skeletal structure formed of randomly oriented elongate sticks with multiple fibrous projections which maintain the elongate sticks in a loosely cohesive mass. The term "loosely cohesive mass" as used herein means that when a mass of elongate sticks is deposited on a surface the elongate sticks maintain a three dimensional random orientation. It has been found that the elongate sticks with the multiple fibrous projections will orient themselves randomly into a three dimensional skeletal structure because the fibrous projections loosely interlock with each other or with solid portions of contiguous elongate sticks to produce the loosely cohesive mass so that when they are bonded with a binder a rigid composite product with isotropic physical characteristics is produced. Without the multiple fibrous projections the elongate sticks tend to orient themselves in a single plane to produce very anisotropic rigid composite products.

The degree of fibrilation of the elongate sticks represents one means for varying the dimensional properties of the composite products of the present invention. With more fibrilation on the elongate sticks, the orientation of the elongate sticks is more random and thus the physical characteristics of the rigid composite product are more isotropic.

The elongate sticks preferably have similar dimensions so that the fibrous projections can effectively maintain a more uniform three dimensional skeletal structure. The term "similar dimensions" as used herein is defined to mean that the majority of the elongate sticks have lengths such that the smallest sticks are about one-half the length of the largest sticks. The thicknesses are such that the smallest sticks are about one-quarter the thickness of the largest sticks. The average length can be about one-half inch in the cohesive mass up to about four inches. The average width can be as small as one-sixteenth of an inch in the cohesive mass up to about one inch. Larger or smaller average dimensions for the elongate sticks in the cohesive mass can be used, however the above ranges are preferred. Usually the thickness of the rigid composite product to be produced dictates the average dimensions selected. For relatively thin rigid composite products the smaller average dimensions in the cohesive mass are used. For the relatively larger rigid composite products the average dimensions can be increased. In general the largest size conducive to proper forming is preferred.

The elongate sticks having the multiple fibrous projections can be composed of essentially any solid material, for instance plastics or resins, metals and various naturally occuring materials particularly wood. The manner of producing the fibrous projections will depend upon the physical characteristics of the solid material. Where the solid material has isotropic strength characteristics the elongate sticks having the projections can be produced by molding or cutting the solid material to produce the elongate sticks and/or fibrous projections. Where the strength characteristics of the solid material are anisotropic such as with wood, the elongate sticks with the fibrous projections can be produced by hammer or attrition milling.

Wood is by far the best solid material for producing the elongate sticks with the fibrous projections because it is inexpensive and its anisotropic strength characteristics resulting from the grain of the wood in growth allows it to be easily reduced to elongate sticks with the fibrous projections. The natural cleavage of the wood along its grain under random milling stress produces fibrous projections on its surfaces as does the breaking of the wood across the grain. The result is that the ends of the elongate sticks have fibrous projections from the breaking and the sides of the elongate sticks have fibrous projections from the partial cleavage along the grain. These elongate sticks are generally referred to herein as fibrilated wood sticks. Further these elongate wood sticks with the fibrous projections readily tend to form the cohesive mass with the three dimensional skeletal structure which with the binder produces a rigid composite product with isotropic physical characteristics.

The degree of fibrilation and hence the similarity of the physical characteristics is controllable in part by the moisture content of the wood at the time of milling. In general green or unseasoned wood with a moisture content in excess of about (30) percent by weight must be used in order to get satisfactory fibrilation. Once the wood begins to dry from its green state the degree of fibrilation decreases because fibrilation cleavage along the grain is greatly reduced until eventually there is little or no fibrilation particularly at moisture contents of less than about twelve percent (12%) by weight. Once the wood has dried, the reintroduction of the moisture, as by soaking in water, is relatively ineffective as a means of controlling the degree of fibrilation.

The binder must be dispersed and hardened in the three dimensional skeletal structure of elongate sticks without compressing the cohesive mass in order to preserve the isotropic physical characteristics of the resulting composite product. If the cohesive mass is compressed, the elongate sticks orient themselves in a single plane normal to the direction of compression and the resulting product has very anisotropic physical characteristics. Thus the binder selected must be liquid to allow it to be dispersed throughout the cohesive mass, and must harden or solidify and bond without compression so that the three dimensional skeletal structure of the cohesive mass is preserved. The contrary consequence of subjecting the mass to compression is to induce planar alignment of the sticks and anisotropic physical properties.

Compaction in a mold represents one means of engineering strength properties as prescribed by the design of the rigid composite product particularly local compaction at high stress areas such as at intersecting planes. The term "compaction" means the displacement or reorientation of the elongate sticks without compressing them. In no way does compaction as here suggested result in storage of distortion energy or internal stresses which causes latent instability. The latter is caused by deformation of individual sticks by compression, while the strength adjustments are the result of reorientation or relocation of individual sticks and of reducing interstitial volume. By limiting compaction to the equivalent of hand or light tamping deformation does not occur.

Within these limitations, various binders can be used such as inorganic binders including the oxysulfate and oxychloride cements, and organic binders including, resins such as epoxy, phenolic formaldahydes, isocyanate derived including polyurethane, urea formaldahydes, polyvinyl acetate, and the like. Particularly preferred are those binders which harden and bond without the need for external heat. It is also preferred that the binder harden rapidly or at least become tacky enough to maintain the three dimensional skeletal structure in the mold. The kinds and characteristics of binders suitable for the present invention, including rigid, flexible and semi-flexible foams, art known to those skilled in the prior art and are available commercially.

In certain instances it is preferred to disperse only a limited amount of binder into the cohesive mass in forming the rigid composite product. The resulting composite product has interconnected voids between the bonded elongate sticks. In other instances it is preferred to fill the voids in the cohesive mass of elongate sticks with the binder to produce a solid rigid composite product. Both types of rigid composite products have advantages for particular applications, however, it is much preferred to produce rigid composite products which have densities between the extremes of density represented by these rigid composite products. By far the most preferred rigid composit product is produced by foaming and hardening a binder in situ in the cohesive mass of elongate sticks in a mold, since the internal foaming pressure provides a dispersal force tending to maintain the three dimensional skeletal structure of the cohesive mass. The resulting rigid composite product has a relatively low density, is strong and exhibits isotropic strength characteristics.

In general the binder is dispersed or mixed into the cohesive mass of elongate sticks by any suitable means so long as the three dimensional skeletal structure of the loosely cohesive mass of elongate sticks is maintained. This may be done before or during or after forming for instance. In certain instances it is preferred to bond the elongate sticks together with a suitable binder and then to introduce a filler material in order to fill the voids and produce a solid or foamed composite product. In other instances it is preferred to bond and fill the cohesive mass of elongate sticks together simultaneously with solid or foamed binder.

The foregoing is a general description of the rigid composite products and the process for their preparation of the present invention. The following description will describe the invention more specifically.

SPECIFIC DESCRIPTION

The following Examples 1 to 13 illustrate the process for the preparation of the rigid composite products of the present invention. In each instance a cohesive mass of elongate wood sticks was used as described hereinafter. Referring to FIG. 1, an elongate wood stick 10 is illustrated with the grain 11 along the length of the elongate wood stick 10 and with fibrous projections 12(a) and 12(b) and a split 13 along a natural cleavage plane. The fibrous projections 12(a) result from breaking of a larger piece of wood by applying shearing or tearing pressure normal to the grain 11 or impact forces parallel to the grain 11. The fibrous projections 12(b) result from the differential local cleaving or splitting of a larger piece of wood along the grain 11. The fibrous projections 12(a) and 12(b) result from the natural splitting of the wood; and while the end fibrous projections 12(a) are not absolutely necessary for the purposes of the present invention, they are useful in maintaining a loosely cohesive mass of such elongate sticks 10 in a three dimensional orientation. Referring to FIG. 2, a loosely cohesive mass 14 of elongate wood sticks 17, is shown deposited on a surface 18. As can be seen from FIG. 2, the end fibrous projections 16 and lateral fibrous projections 15 maintain the elongate sticks 17 in the loosely cohesive mass 14.

Larger pieces of wood are easily reduced to elongate sticks 17 in the form of the loosely cohesive mass 14. This can be accomplished by conventional hammer or attrition milling with certain modifications to produce the elongate sticks of relatively uniform dimensions or size with the fibrous projections. A hammer mill was used without the conventional grate so that the hammers impacted the wood against the sides of the mill promoting more natural cleavage. The grate would have broken the wood excessively. A similar result can be achieved with an attrition mill with some of the teeth removed from the plates. In both instances the modification allowed the tearing of the wood by impact or by rubbing contact. It was usually necessary to reduce unseasoned or green wood (about 30% by weight or more moisture) to produce the elongate sticks with the fibrous projections and then dry the resulting cohesive mass to the required moisture content such as by air drying or forced drying.

In the following examples the term "cohesive wood mass" will refer to the above description.

EXAMPLE 1

Referring to FIG. 5, the rigid composite product 36 illustrated (which is a cabinet for a speaker) was produced using the process illustrated in Steps 1, 2, 3, and 4.

As illustrated in Step 1 of FIG. 5, a cohesive wood mass 27 of aspen in the form of elongate fibrilated sticks 10 (FIG. 1) having an average length of about three-quarters inch and an average width of about one-eighth inch was mixed in a mixer 29 with a moisture curing and foaming polyurethane prepolymer liquid binder 28. The cohesive wood mass 27 had a moisture content of about twelve percent (12%) and was prepared by hammer milling green aspen and then drying the cohesive wood mass 27.

The liquid binder 28 was a polyether polyurethane isocyanate terminated prepolymer which foamed and cured to a rigid foam in contact with the moisture in the wood sticks 10 in the cohesive wood mass 27 and was prepared by mixing 100 parts of polyether polyurethane isocyanate terminated prepolymer containing twenty percent (20%) by weight toluene solvent with one (1) part by weight of 1,2,4-trimethylpiperazine curing catalyst, eight (8) parts of toluene solvent and three (3) parts silicone surfactant and was mixed into the cohesive wood mass 27 in the ratio of two (2) parts by weight binder 28 to one (1) part by weight cohesive wood mass 27.

The mixture 33 of the cohesive wood mass 27 and binder 38 was then charged in Step 2 to a mold 30 (shown in cross section) in the shape of a speaker cabinet with a center post 31 with light tamping at the corners. A poly-vinyl film 32 lined the mold 30 and center post 31 which acted as a parting and texturing agent and surface film promoter.

In Step 3 of FIG. 5, a weighted cover 35 with polyvinyl parting film 34 was placed over the mold 30 to maintain the three dimensional skeletal structure of the cohesive wood mass 27 during the foaming and curing of the binder 28 in situ. The binder 28 foamed in situ and hardened generating an exotherm to form the rigid composite product 36. A cross section 23 of the resulting rigid composite product 36 is illustrated in FIG. 4 wherein rigid polyurethane resin 24 bonds a cohesive mass of wood sticks 26 with foam in the interstitial spaces. A thin polyurethane skin 25 was present on all of the surfaces. The rigid composite product 36 had isotropic physical characteristics, had a modulus of rupture in bending of 300 p.s.i. and the surface 37 was textured from the parting film 34.

Table 1 sets forth the process conditions of Example 1 as well as variations of process conditions of Example 1 and the properties of the resulting rigid composite products.

the present invention approach this theoretical ratio. In general the composite products of the present invention have a thickness to length water absorption increase ratio between about 10 to 1 and approach 1 to 1. By comparison, prior art materials have very high thickness to length water absorption increase ratios, because of the extensive compression of the flakes or chips in forming the materials which produce releasable internal stresses and deformations and/or because of planar orientation of the structural elements. For example flake board has a ratio of about 133 to 1; plywood about 50:1; hardboard 40 to 1; tempered high density hardboard about 45 to 1. The ratios for the composite products of the present invention are thus much less (one-fourth to one-thirteenth) than those of the prior art. More importantly, the dimension changes are reversible so that the original dimension is restored upon drying, whereas with the other composite products, plywood excepted, some of the swelling remains as a permanent dimension change. The stability of the composite products of the present invention under in service conditions are thus much better, particularly where moisture or water is encountered in use.

In preparation of the rigid composite products, about three (3) parts by weight of a silicone surfactant to one hundred (100) parts polyurethane prepolymer was found to produce a foam with low hardening or curing shrinkage, which was tough and had a uniform cell size. The characteristics of such foams with and without the silicone using water as a foaming agent and without the cohesive wood mass can be seen in the following Table 2.

TABLE 2

| Polyurethane prepolymer composition | | | | Change in composite product volume upon hardening | | |
|---|---|---|---|---|---|---|
| Polyurethane prepolymer, grams | Added water, percent by weight | Added catalyst, percent by weight | Silicone, percent by weight | Initial volume | Final volume | Relative foam cell size |
| 20 | 2.5 | 1 | 0 | 300 | 150 | Fine. |
| 20 | 5 | 1 | 0 | 300 | 200 | Fine to medium. |
| 20 | 10 | 1 | 0 | 300 | 250 | Fine. |
| 20 | 15 | 1 | 0 | 250 | 220 | Do. |
| 20 | 5 | 0.5 | 0 | 250 | 200 | Fine to medium. |
| 20 | 5 | 2 | 0 | 300 | 200 | Medium. |
| 20 | 10 | 3 | 0 | 300 | 290 | Medium course. |
| 20 | 5 | 1 | 3 | 500 | 290 | Fine. |
| 20 | 5 | 1 | 3 | 600 | 290 | Do. |

It was found that the optimum amount of catalyst was between one (1) to two (2) parts per one hundred (100) parts of polyurethane prepolymer. With low amounts of catalyst there was considerably less foam and high shrinkage of the foam on curing. When more than this amount of catalyst was used the shrinkage was low, but the volume of foam produced pre one hundred (100) parts of polyurethane prepolymer was again reduced, though not

TABLE 1

| | Ratio binder to cohesive wood mass | Molding conditions | Modulus of rupture, (pounds per square inch | Void condition | Water absorption,[1] percent | Thickness increase water absorption, percent | Length increase water absorption, percent | Density, pounds per cubic foot |
|---|---|---|---|---|---|---|---|---|
| Example No.: | | | | | | | | |
| 1 | 2:1 | Weighted cover. | 300 | Foam filled | 20.6 | 1.57 | 0.32 | 17.4 |
| 2 | 1.3:1 | Clamped cover. | 970 | do | 15.2 | 2.68 | 0.50 | 27.4 |
| 3 | 1:1 | Film cover. | 450 | Partially foam filled | 43.0 | 3.13 | 0.75 | 18.0 |

[1] Soaked in water at room temperature.

As can be seen from Table 1, the ratio of thickness to length increases in the rigid composite products of the present invention because of water absorption is very low as follows: Example 1 to 4.9 to 1, Example 2 is 5.4 to 1, Example 3 is 4.2 to 1. The theoretical ratio of 1 to 1 would mean that the composite product would be completely isotropic with respect to this property and as can be seen from the above Examples 1 to 3 the products of as much as with low catalyst. These results were also found to apply when the cohesive wood mass was present.

It was found that the amount of foam could be controlled by the incorporation of a solvent into the prepolymer. Thus when a formulation of twenty (20) grams prepolymer (containing twenty percent (20%) by weight toluene), eight-tenths (0.8) gram water, two-tenths (0.2) gram catlayst and four-tenths (0.4) gram silicone was mixed with no toluene, six hundred (600) cubic centimeters of foam was produced; with five (5) grams of additional toluene one hundred (100) cubic centimeters of foam was produced and with ten (10) grams of additional toluene or more, no foam was produced. The use of solvents and other techniques for controlling the amount of foam production is well known to those skilled in the prior art.

The wood and its moisture content has a considerable effect on the foaming and bonding which can also be controlled by proper formulation. The following Examples 4 to 9 in Table 3 wherein the procedure of Example 1 is repeated, illustrate the effect of the wood and its moisture using a polyurethane isocyanate terminated prepolymer binder composition of one hundred (100) parts polyether polyurethane prepolymer containing about twenty percent (20%) by weight toluene solvent.

TABLE 3

| Example | Percent wood moisture | Aspen, parts wood | Prepolymer composition by weight, parts | Catalyst, parts | Additional parts toluene solvent | Silicone parts, by weight | Results |
|---|---|---|---|---|---|---|---|
| 4 | 8 | 200 | 100 | 0.5 | 25.0 | 0.0 | Bonded but not foamed. |
| 5 | 30 | 100 | 100 | 1.0 | 25.0 | 0.0 | Foamed and bonded. |
| 6 | ² 50 | 100 | 100 | 1.0 | 0.0 | 3.0 | Do. |
| 7 | ³ 16 | 120 | 100 | 1.0 | 0.0 | 2.0 | Do. |
| 8 | 8 | 100 | 100 | 0.0 | 25.0 | 0.0 | No bonding or foaming. |
| 9 | 8 | 100 | 150 | 1.0 | 8.0 | 3.0 | Bonded and foamed. |

¹ Without the catalyst there was no foaming or bonding at eight percent (8%) moisture content. Higher moisture contents are required for bonding and foaming with no catalyst.
² The aspen cohesive wood mass was dipped in water before blending.
³ Dry oak cohesive mass was used which was soaked in 0.1 N NaOH aqueous solution and redried to a 16 percent moisture content.

Table 3 illustrates that considerable moisture in the wood can be tolerated. Further, pretreatment of the cohesive mass with water or a basic or alkaline solution was found to be particularly valuable as a means of controlling the foaming. In fact it was found that the basic solution treatment increased the amount of foam produced.

The cohesive wood mass can have a moisture content between about eight (8) percent by weight and saturation, preferably between eight (8) and thirty (30) percent, when polyurethane prepolymer compositions are to be foamed and cured in situ, because the resulting wood to polyurethane bonds are stronger and the polyurethane foam is superior. It will be appreciated however that various well known catalyzed polyurethane resins, and resin blowing agents such as the Freons$_{T.M.}$ can be used with or without any moisture being present in the wood and water can be added to the prepolymer compositions. It should be noted that it is sound technological practice to assemble wood at a moisture content close to what it is expected to have in service.

As to the polyurethane prepolymer compositions, these are well known in the prior art. Many catalysts such as tertiary amines are also well known as is the use of solvents for the polyurethane prepolymer. The use of substantial amounts of such solvents is not preferred since unless counteracted by viscosity builders; they reduce or eliminate the foaming of the polyurethane prepolymer in contact with water or moisture also a persistent objectionable odor is retained in the product.

The use of water or moisture to foam and harden isocyanate derived polymers is well known in the prior art. The isocyanate groups in the prepolymer react with the water or moisture to produce carbon dioxide which expands to produce the foam at the same time producing amines which further react with isocyanate groups. In certain instances polyisocyanates are mixed with the isocyanate derived polymers to increase the isocyanate groups available for reaction with the water or moisture to produce the foam. These compositions and the production of foams in this manner are well known to those skilled in the prior art.

The following Example 10 illustrates another variation in the process for the preparation of the composite products of the present invention.

EXAMPLE 10

Referring to FIG. 6, a cohesive wood mass 39, identical to that used in Example 1, was provided in a mold 38 (shown in cross section) lined with a poly-vinyl film 40 in the shape of a rectangle by light tamping in Step 1. In Step 2, the cohesive wood mass was mixed with a moisture foaming polyurethane prepolymer binder 43, identical to that used in Example 1, by supplying the binder 43 under pressure through spray means 41 controlled by valve 42 directed into the cohesive wood mass 39 such that the ratio of binder to cohesive wood mass was two (2) to one (1). In Step 3, a poly-vinyl film 44 was provided over the cohesive wood mass 39 and binder 43 mixture and the mold 38 was closed with a cover 45 and the binder 43 foamed and cured in situ to form the rigid composite product 46. In Step 4, the rigid composite product 46 was removed. It was found to have a textured surface skin 47 from the poly-vinyl film 40 and 44. The product was identical to that of Example 1 and shown in cross section in FIG. 4.

The process of Example 10 is particularly adapted to continuous production of sheets or boards, in contrast to the process of Example 1 which is particularly adapted to the production of molded shapes. Continuous production in Example 10 is easily accomplished by making the mold 38 part of a moving belt with Steps 1 to 4 being performed at various stations. Since no compression is required the mold closure in Step 3 is easily accomplished. Alternatively the process of Example 10 can also be used to make molded shapes and in this instance it is preferred that the binder 43 be introduced by spray gun adapted to handle the binder 43.

The following Examples 11 to 13 illustrate the use of other binder systems in the process of the present invention.

EXAMPLE 11

An aqueous solution of a resorcinol modified phenol resin bindner conventionally used in lumber laminating was mixed with paraformaldehyde catalyst and was then carefully blended with the cohesive wood mass (average length one (1) inch; width one-eighth (⅛) inch) in the manner of Example 1 so that the three dimensional skeletal structure was retained in the ratio of one and one-half (1.5) parts binder to one (1.0) part cohesive wood mass by weight and placed in a mold. The resin binder hardened and a composite product was produced with a three dimensional skeletal structure 19 as illustrated in FIG. 3 with the resin binder 22 bonding together elongate sticks 20. Fibrous projections 21 were still plainly visible in the composite product.

EXAMPLE 12

A urea-formaldehyde powdered resin which was precatalyzed for cold setting was fluidized with water and then blended with the cohesive wood mass as in Example 11 in the ratio of one and one-half (1.5) parts binder to one (1.0) part cohesive wood mass by weight and placed in a mold. The resin binder hardened and produced a bonded three dimensional skeletal structure as shown in FIG. 3 and discussed in Example 11.

EXAMPLE 13

An aqueous polyvinyl acetate emulsion binder as commonly used in woodworking as an adhesive was blended with the cohesive wood mass as in Example 11 in the ratio of one and one-half (1.5) parts resin binder to one (1.0) part cohesive wood mass by weight and placed in a mold. The resin binder hardened and produced a three dimensional skeletal structure as shown in FIG. 3 and discussed in Example 11.

In each of the above Examples 11 to 13, the product was redried to remove water which served as a carrier for the resin binders. It is obvious that a minimum amount of solvent commensurate with the fluidity needed for distribution on the sticks is preferable.

In general it was found that the cohesive wood mass should have a density of between about four (4) to twenty-four (24) pounds per cubic foot without the binder and a void volume of about forty (40) to eighty (80) percent. The density of the cohesive wood mass and void volume is dependent upon the density of the original wood and the strength desired in the final product. The rigid composite products have a density between about twelve (12) pounds per cubic foot with a lightweight binder to sixty-five (65) pounds per cubic foot with a heavy solid binder.

In the rigid composite products of the present invention the weight ratio of binder to the elongate sticks has a strong influence on strength. Strength increases with increasing binder ratios until an optimum is reached. Beyond this optimum, strength remains constant or declines. Contrary to expectations, where the binder forms a continuous phase such that the three dimensional skeletal structure of the loosely cohesive mass of elongate sticks is not maintained, the material produced has relatively poor strengths. This is particularly evident in the systems where a foam is produced in situ. The loosely cohesive mass with the liquid binder must be maintained so that the foam being generated in situ does not disrupt the three dimensional skeletal structure producing continuous phases of foam. The specific binder to elongate stick weight ratios will depend upon the characteristics of the binder and elongate sticks but in each instance the three dimensional skeletal structure must be maintained while the binder is hardened in order to achieve isotropic characteristics.

The weight ratio of binder to cohesive wood mass in foam systems was between about one-half (0.5) to one (1) to two (2) to one (1) by weight. Where the binder served only to bond the cohesive wood mass together and leave the void spaces, the ratio of binder to cohesive mass was about one (1) to two (2) as a minimum. Where the voids were filled with solid binder the ratio of binder to cohesive mass was a maximum of about four (4) to one (1).

The composite products of the persent invention were found to have isotropic physical characteirstics. This means that the physical characteristics were approximately the same in all dimensions. It will be appreciated however that there will be some random variation in the strength characteristics because of variations in the orientation and dimensions of the elongate sticks forming the three dimensional skeletal structure and it is intended that on the average the strength characteristics for composite products of the same kind can have isotropic physical characteristics. In general, the greater the compaction of the cohesive mass into the mold the less similar will be the physical characteristics in all dimensions, particularly localized compaction around corners and the like.

It will be appreciated that the binder can be sprayed, coated or otherwise dispersed on the cohesive mass or elongate sticks. In each instance the cohesive mass must have the three dimensional skeletal structure of elongate sticks initially so that the addition of the binder or subsequent hardening of the binder causes no compaction or stratification except where intended to gain additional or directional strength.

Because of the nature of the cohesive mass, it can be molded in a closed mold during the hardening of the binder. This is considered to be a distinct advantage in the present invention, since complex shapes are easily obtained in the composite products and yet they have isotropic physical characteristics or can have localized directional properties. One of the advantages of the three dimensional skeletal structure of elongate sticks is that it can be caused to orient where and how desired.

Any type or species of wood is suitable for preparing the rigid composite products of the present invention, although hard woods rather than soft woods are preferred. Contrary to the prior art statements, high density woods perform as well as low density woods. Thus pine, aspen, oak, maple, elm and other woody cellulose materials desired or undesired in present commercial practice can be used to prepare the fibrilated wood sticks. Where the acidic or basic properties of the wood interfere with hardening of the liquid binder, as did the acidic oak shown in Example 7 which was neutralized with an aqueous sodium hydroxide solution, then the surfaces of the fibrilated wood sticks can be treated with a neutralizing agent to prevent the interference or the surface otherwise chemically treated to prevent the acidic or basic character of the wood from interfering with the hardening of the liquid binder. Further the fibrilated wood sticks can be chemically treated by various agents which reduce flammability or deterioration in the manner known to the prior art for treating wood. Because of the very large surface area to mass ratio of the fibrilated wood sticks due to the fibrous projections and irregular cross-section, chemical treatment for the above purposes has been found to be effective by comparison to such treatment of the prior art structural elements.

In the rigid composite products of the present invention, the rigidity is imparted by the bonded three dimensional skeletal structure. This is the case even though the individual elongate sticks are somewhat flexible and the binder is flexible. Once the elongate sticks are bonded together the structure becomes rigid. The term "rigid" as used herein means that the rigid composite product has limited flexibility under pressure.

The rigid composite products of the present invention are particualrly useful for molded products and various sheet structural products. The foamed products of the present invention have low thermal conductivity and good sound absorption properties and are thus particularly useful in applications where these properties are important.

The foregoing description is intended to be only illustrative of the present invention and it is intended that this invention be limited only by the hereinafter appended claims.

I claim:

1. The process for the preparation of a rigid composite product which comprises:
    (a) forming elongate wood sticks of about one-half inch to four inches in average length and one-sixteenth inch to one inch in average thickness, the smallest lengths being about one-half the lengths of the largest sticks and the smallest thicknesses being about one-quarter the thickness of the thickest sticks, said elongate sticks having multiple fibrous surface projections and being formed by hammer milling larger pieces of wood in a hammer mill without a grate so that the hammers impact the wood against the sides of the mill to split or tear the larger pieces into said elongate sticks;
    (b) forming said elongate sticks into a three dimensional skeletal structure with the multiple fibrous projections maintaining the randomly oriented elongate sticks in a loosely cohesive shape maintaining mass having a bulk density alone between about four to twenty-four pounds per cubic foot and a void volume between about forty to eighty percent said mass being mixed with a liquid binder which hardens to a solid binder without compressing the elongate sticks and binder together; and (c) maintaining the mixture of the loosely cohesive mass and liquid binder without compressing the elongate sticks and binder together so that the elongate sticks are rigidly bonded together and so that the three dimensional skeletal structure is retained until the binder is hardened to form the rigid composite product wherein the composite product has a binder to elongate stick weight ratio between about 1 to 2 as a minimum and 4 to 1 as a maximum and has a reversible thickness to length water absorption increase between about 10 to 1 and 1 to 1.

2. The process of claim 1 wherein the wood sticks are produced by the hammer milling of unseasoned wood with a moisture content in excess of thirty percent by weight.

3. The process of claim 1 wherein the elongate wood sticks in step (b) have a moisture content between about eight percent by weight to saturation and wherein the liquid binder is a liquid isocyanate derived prepolymer resin binder composition which foams and hardens to a solid binder in contact with the moisture in the wood sticks.

4. The process of claim 3 wherein the hardened isocyanate derived polymer is rigid.

5. The process of claim 1 wherein the loosely cohesive mass of elongate sticks is mixed with the liquid binder and the mixture is introduced into a mold which is closed to maintain the mixture until the rigid composite product is formed.

6. The process of claim 5 wherein the liquid binder is a liquid polyurethane resin composition which foams and cures in situ in the loosely cohesive mass of elongate sticks.

7. The process of claim 5 wherein the loosely cohesive mass of elongate sticks is provided in a mold, a liquid binder is introduced into the loosely cohesive mass and then the mold is closed to maintain the mixture until the rigid composite product is formed.

8. The process of claim 7 wherein the liquid binder is introduced into the loosely cohesive mass by spraying.

9. The process of claim 8 wherein the liquid binder is a liquid polyurethane resin composition which foams and cures in situ in the loosely cohesive mass of elongate sticks.

References Cited
UNITED STATES PATENTS

| | | | |
|---|---|---|---|
| 2,446,304 | 8/1948 | Roman | 241—28UX |
| 2,817,617 | 12/1957 | Rogers | 264—123X |
| 3,245,867 | 4/1966 | Clarke | 161—168 |
| 3,256,218 | 6/1966 | Knox | 264—45UX |

ROBERT F. BURNETT, Primary Examiner

R. O. LINKER, Jr., Assistant Examiner

U.S. Cl. X.R.

161—168; 241—28; 264—128